(12) United States Patent
Lemelson et al.

(10) Patent No.: US 7,602,947 B1
(45) Date of Patent: *Oct. 13, 2009

(54) FACIAL-RECOGNITION VEHICLE SECURITY SYSTEM

(76) Inventors: Jerome H. Lemelson, Unit 802, Suite 286, 930 Tahoe Blvd., Incline Village, NV (US) 89451-9436; Louis J. Hoffman, 15150 N. Hayden Rd., Suite 202, Scottsdale, AZ (US) 85260

( * ) Notice: Subject to any disclaimer, the term of this patent is extended or adjusted under 35 U.S.C. 154(b) by 148 days.

This patent is subject to a terminal disclaimer.

(21) Appl. No.: 11/538,438

(22) Filed: Oct. 3, 2006

Related U.S. Application Data

(63) Continuation of application No. 10/793,153, filed on Mar. 4, 2004, now Pat. No. 7,116,803, which is a continuation of application No. 10/094,360, filed on Mar. 8, 2002, now Pat. No. 6,831,993, which is a continuation of application No. 08/647,674, filed on May 15, 1996, now Pat. No. 6,400,835.

(51) Int. Cl.
*G06K 9/00* (2006.01)
*B60R 25/10* (2006.01)
(52) U.S. Cl. .................. 382/116; 382/115; 340/426.1
(58) Field of Classification Search .............. 382/115, 382/118, 100, 104, 117, 124; 340/426.1, 340/426.24, 426.31, 5.53, 5.83; 307/10.2, 307/10.3, 10.5, 10.6

See application file for complete search history.

(56) References Cited

U.S. PATENT DOCUMENTS 2,914,746 A 10/1959 James
3,466,394 A 9/1969 French (Continued)

FOREIGN PATENT DOCUMENTS

DE 3743-856 A 7/1989

(Continued)

OTHER PUBLICATIONS

Atick, Joseph J., Griffin, Paul A., Redlich, A. Norman, "The Vocabulary of Shape: Principal Shapes for Probing Perception and Neural Response", Computational Neuroscience Laboratory, The Rockefeller University, New York, NY (DateUnknown).

(Continued)

*Primary Examiner*—Duy M Dang
(74) *Attorney, Agent, or Firm*—Louis J. Hoffman

(57) ABSTRACT

A movable-vehicle security system includes a facial-recognition system including a scanner such as a television or infrared camera directed at the face of a person in the driver's seat, which system produces output control signals that are applied to enable or disable operation of the vehicle, with or without a key or other supplemental security system. In a particular embodiment, the system includes a camera mounted on the "third taillight" assembly (which is preferably mounted below the roof and inside the rear window), directed at the rear-view mirror, and coupled to a facial-recognition computer, which in turn is coupled (with appropriate security precautions) to an enabling element for the vehicle, such as a starter motor. In a further embodiment, the system can be coupled to various elements of the motive system to create an auto-starting car.

29 Claims, 3 Drawing Sheets

U.S. PATENT DOCUMENTS

| | | |
|---|---|---|
| 3,665,160 A | 5/1972 | Lopata |
| 3,673,331 A | 6/1972 | Hair et al. |
| 3,678,192 A | 7/1972 | Akuta et al. |
| 3,693,166 A | 9/1972 | Rawson et al. |
| 3,803,350 A | 4/1974 | Lemelson |
| 3,805,238 A | 4/1974 | Rothfjell |
| 3,866,173 A | 2/1975 | Moorman et al. |
| 3,872,443 A | 3/1975 | Ott |
| 3,889,056 A | 6/1975 | Mayer, Jr. et al. |
| 3,943,563 A | 3/1976 | Lemelson |
| 3,985,998 A | 10/1976 | Crafton |
| 4,001,499 A | 1/1977 | Dowell |
| 4,020,463 A | 4/1977 | Himmel |
| 4,051,524 A | 9/1977 | Baxter |
| 4,084,198 A | 4/1978 | Lemelson |
| 4,109,237 A | 8/1978 | Hill |
| 4,114,027 A | 9/1978 | Slater et al. |
| 4,118,730 A | 10/1978 | Lemelson |
| 4,148,061 A | 4/1979 | Lemelson |
| 4,198,656 A | 4/1980 | Mathisen |
| 4,210,899 A | 7/1980 | Swonger et al. |
| 4,213,163 A | 7/1980 | Lemelson |
| 4,237,483 A | 12/1980 | Clever |
| 4,246,568 A | 1/1981 | Peterson |
| 4,283,710 A | 8/1981 | Genest et al. |
| 4,699,149 A | 10/1987 | Rice |
| 4,712,103 A | 12/1987 | Gotanda |
| D302,153 S | 7/1989 | Karecki |
| 4,975,969 A | 12/1990 | Tal |
| 5,012,522 A | 4/1991 | Lambert |
| 5,027,104 A | 6/1991 | Reid |
| 5,202,929 A | 4/1993 | Lemelson |
| 5,291,560 A | 3/1994 | Daugman |
| 5,410,609 A | 4/1995 | Kado et al. |
| 5,448,456 A | 9/1995 | Huynh |
| 5,450,504 A | 9/1995 | Calia |
| 5,512,901 A | 4/1996 | Chen et al. |
| 5,519,260 A | 5/1996 | Washington |
| 5,557,254 A | 9/1996 | Johnson et al. |
| 5,574,424 A | 11/1996 | Nguyen |
| 5,661,451 A | 8/1997 | Pollag |
| 5,686,765 A | 11/1997 | Washington |
| 5,729,619 A | 3/1998 | Puma |
| 6,400,835 B1 * | 6/2002 | Lemelson et al. ........... 382/118 |
| 6,831,993 B2 * | 12/2004 | Lemelson et al. ........... 382/118 |
| 7,116,803 B2 * | 10/2006 | Lemelson et al. ........... 382/118 |

FOREIGN PATENT DOCUMENTS

| | | |
|---|---|---|
| JP | 63-116957 | 5/1988 |

OTHER PUBLICATIONS

Armstrong, Larry and Holyoke, Larry; "NASA's Tiny Camera Has A Wide-Angle Future"; Business Week; Mar. 6, 1995; pp. 54-55.

Atick, Joseph J. et al., "Face Recognition From Live Video For Real-World Applications—Now", available on internet at http://venezia.Rockefeller.edu (1996).

Fossum, Eric R., "Low Power Camera-On-A-Chip Using CMOS Active Pixel Sensor Technology", Symposium on Low Power Electronics, Oct. 9-10, 1995, pp. 1-4.

Harby, Karla, "A Discerning Eye", Scientific American, Apr. 1996, p. 38.

Mukerjee, Madhusree, "About Face", Scientific American, Dec. 1995, p. 25.

Perez, Evan, "Security System Uses Your Face As The Password", San Francisco Chronicle (approximately Oct. 1995).

Prabhakar, Arati, "Technology Infrastructure", Scientific American, Sep. 1995, pp. 192-194.

Ushida, Hirohide, Takagi, Tomohiro, Yamaguchi, Toru, "Recognition of Facial Expressions Using Conceptual Fuzzy Sets," IEEE, Jul. 1993.

Hong, Lin and Jain, Anil, "Integrating Faces and Fingerprints for Personal Identification", IEEE Transactions on Pattern Analysis and Machine Intelligence, Dec. 1998, pp. 1295-1307.

Brunelli, Roberto and Falavigna, Daniele, "Person Identification Using Multiple Cues", IEEE Transactions on Pattern Analysis and Machine Intelligence, Oct. 1995, pp. 955-966.

* cited by examiner

FACIAL-RECOGNITION VEHICLE SECURITY SYSTEM

STATEMENT OF RELATED APPLICATIONS

This application is a continuation of Ser. No. 10/793,153, filed Mar. 4, 2004, now U.S. Pat. No. 7,116,803; which is a continuation of Ser. No. 10/094,360, filed Mar. 8, 2002, now U.S. Pat. No. 6,831,993, which is a continuation of Ser. No. 08/647,674, filed May 15, 1996, now U.S. Pat. No. 6,400,835.

FIELD OF THE INVENTION

The invention is in the field of security systems for automobiles or other vehicles.

BACKGROUND OF THE INVENTION

1. Prior Art

Various types of security systems for motor vehicles are known in the art. For example, virtually all moving vehicles have keyed ignition switches, and most vehicles have keyed or otherwise locked barriers preventing or hindering access to the ignition switch, usually in the form of a locked-door passenger cabin. However, such key and barrier systems have proven easy for thieves to defeat in a matter of a few seconds, by breaking glass windows, "jimmying" doors, etc. Ignition systems are also easy to defeat, by "hotwiring" or key falsification.

In response, a variety of supplemental security devices have been used, such as steering-wheel-securing "clubs" and alarms triggered by movement of a locked car. However, thieves, too, have taken corresponding countermeasures, such as by learning how to alter or ignore alarm systems or remove clubs by cutting the steering wheel. In addition, the public has become jaded because loud and annoying car alarms are often triggered accidentally, by casual touching or even blowing wind.

As a result, auto theft remains a multi-billion dollar "business," despite the best efforts of the auto industry, police, and aftermarket suppliers.

Various types of electronic personal-recognition systems are known in the art, including electronic fingerprint, palmprint, signature, and voiceprint-recognition devices. It is also known how to locate a face in a random video scene, identify the face, and distinguish the recognized individual from other persons by electronically camera scanning facial features and comparison to stored parameters derived from previous scans. Representative of such "facial-recognition" systems are U.S. Pat. No. 4,975,969, issued in 1990 to Tal; U.S. Pat. No. 5,012,522, issued in 1991 to Lambert, including the patents, devices, and articles described therein, such as those related to so the Face Recognition Machine and the Autonomous Face Recognition Machine; U.S. Pat. No. 3,805,238, issued in 1974 to Rothfjell; U.S. Pat. No. 5,410,609 issued in 1995 to Kado et al.; and U.S. Pat. No. 5,450,504, issued to Calia in 1995. All of such documents, including the references cited therein, are incorporated herein by reference.

However, all of such personal-recognition systems are typically used in security systems designed to detect authorized personnel and prevent unauthorized entry through a building door or a gate. Many fingerprint and facial-recognition systems require extensive and routine-obstructing measures, such as the placement and securing of a head in a fixed location (such as on a chin-rest); requirements of keeping a finger, palm, or face still for an extended period of time; or extended delays for computations to finish. In addition, many such systems require expensive and complex subsystems and may be subject to defeat by impostors or other unauthorized persons.

For the above and other reasons, facial-recognition systems have not previously been applied to automobile security. However, it has been determined that facial-recognition systems are particularly well-suited to solve certain problems associated with vehicle security, when adapted to address the problem of auto theft prevention, as will become apparent below.

2. Objects of the Invention

It is therefore an object of the invention to provide an improved vehicle or automotive anti-theft or security system and method for preventing theft.

It is another object of the invention to provide systems and methods for securing a powered vehicle to prevent its operation except by one or more authorized persons.

It is another object of the invention to provide systems and methods for hindering automotive theft, which are less easily defeated than conventional anti-theft devices.

It is another object of the invention to provide a facial-recognition system for determining whether or not a person attempting to operated a moveable vehicle is a thief.

It is another object of the invention to adopt a facial-recognition system for use in preventing or hindering automobile theft.

It is another object of the invention to provide an automobile anti-theft device that relies on electronic facial recognition of a person in a driver's station or seat.

It is another object of the invention to provide a system for preventing the motion of an automobile unless operated by a recognized user.

It is another object of the invention to provide a security system that assists in improving the safety of operation of automobiles.

It is another object of the invention to provide an electronic system and method that can permit secure but keyless operation of an automobile.

It is another object of the invention to automate the starting system of an automobile.

It is another object of the invention to provide a security system that can be retrofitted into an automobile and does not require designing into an original production model.

SUMMARY OF THE INVENTION

The above and other objects of the invention are achieved in a preferred embodiment of the invention by a system for securing a movable vehicle, and methods of operation and of retrofitting vehicles, which include a facial-recognition system employing a camera directed at the face of a person in the driver's seat, which system produces output control signals or codes that are applied to enable or disable operation of the vehicle, with or without use of a key or other supplemental security system. In a particular embodiment, the invention includes an electronic camera mounted on the front windshield frame, windshield, rear-view mirror, or "third taillight" assembly (which is preferably mounted just below the roof and inside the rear window). In such latter embodiment, the scanning axis of the camera is directed at the rear-view mirror to capture a reflection of the driver's face. The camera output is coupled to a facial-recognition computer, which in turn is coupled to control the operation of an enabling element for the vehicle, such as an ignition switch (which may be solenoid-operated) or a starting motor. In a further embodiment using a sufficiently discriminatory facial-recognition algorithm, the system can be coupled to various elements of the motive system to create an auto-starting car without an ignition switch or ignition key.

Other aspects of the invention will be appreciated by those skilled in the art after reviewing the following detailed description of the invention.

BRIEF DESCRIPTION OF THE DRAWINGS

The novel features of the invention are set forth with particularity in the claims. The invention, together with its objects and advantages, will be better understood after referring to the following descriptions and the accompanying drawings, in which common numerals refer to common elements

DETAILED DESCRIPTION OF PREFERRED EMBODIMENTS

Figure 1:
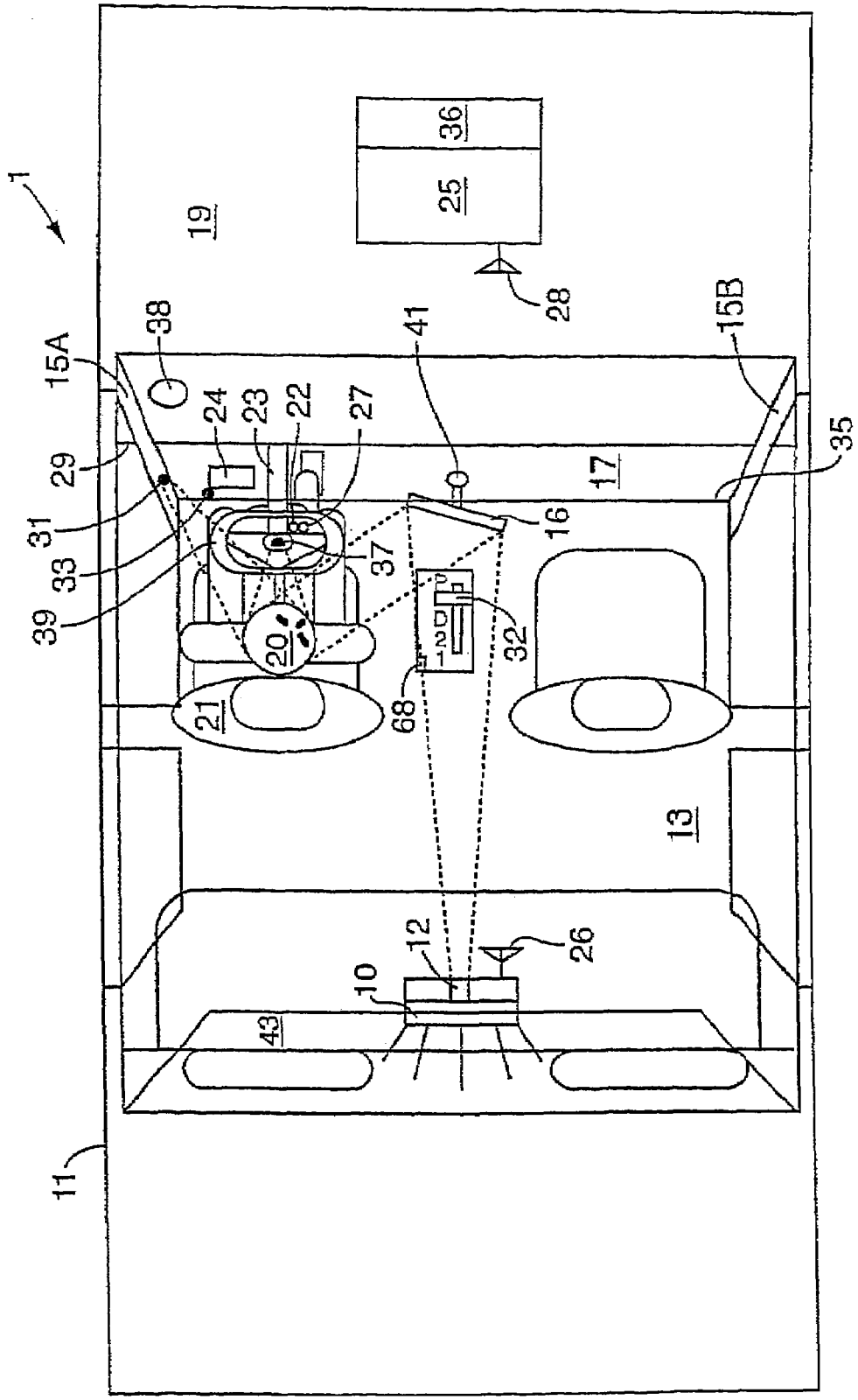
FIG. 1 is a top view showing several embodiments of the invention in a standard, sedan-type automobile.

FIG. 1 shows several arrangements of a system 1 for securing a motor vehicle 11 against unauthorized operation and theft. The motor vehicle 11 comprises a body assembly defining a cabin containing a driver's seat 21. An overhead roof 13 is supported by a plurality of generally vertical frame members 15, including members 15A and 15B supporting a front windshield 17. Beneath a front hood 19 is mounted an engine or electric motor (not shown) powering the vehicle. Supported by the dashboard 29 or the steering column 23 is a start switch (for an electric vehicle) or a multiple-contact ignition switch 22. When an appropriate key 27 is inserted in the receptacle of the ignition switch 22 and rotated by hand, it closes the switch, connecting the starter motor 36 to the battery (not shown) or the battery to an electric drive motor (not shown). The description above relates to a generic passenger vehicle, such as a sedan-type automobile.

Enabling System

In the described system, an enabling or start switch 25 is closed when a person 20, sitting in the driver's seat 21, is electronically identified as authorized to drive the vehicle, by computing circuitry such as described below. Thus, when both switches 22 and 25 are closed, operation of the vehicle is enabled. In each of the embodiments described herein, closure of switch 25 results from electronically scanning a facial feature of the person 20 sitting in driver's seat 21 of the vehicle. The generated image signals are processed or digitized and computer-analyzed to determine if the driver 20 is authorized to operate the vehicle.

The vehicle can be enabled to operate by any means known in the art, including (1) by connecting a source of power, such as a battery or the batteries used to start the vehicle's gasoline engine or to operate an electric drive motor, (2) by valving a source of fuel, such as in a gasoline line, or operating a fuel pump, or (3) by energizing a source of ignition, such as motor starter 36 or spark generators. Alternatively, any other suitable enabling connection can be made to permit vehicle operation upon detection by the computer of an authorized person. For example, the detection system can permit operation of the vehicle for a short period of time, after which the vehicle operation will be terminated and be rendered non-operational, thus frustrating a potential thief. The selected system for enabling/disabling the vehicle is referred to herein as an "enabling device" or an "enabling system."

Although, in the embodiment described in connection with FIG. 1, switch 25 is connected in series with ignition switch 22, neither the specific form of such connection nor the ultimate connection to the enabling device are shown. The absence of such details is indicative that switch 25 (1) can be coupled to ignition switch 22 by wires or by wireless transmission (2) can be provided at any location between ignition switch 22 and the connection to the enabling device, (3) and be visible or concealed. Such switches can also be connected to a logical "AND" circuit having an output connected to the enabling device. Examples of certain embodiments of the appropriate connections the described in more detail below.

In one form, switch 25 opens when ignition switch 22 opens, upon turning and removal of key 27. Thus, when a driver of the vehicle "turns off" the drive motor, switch 25 opens, "priming" it for the next attempted operation of the vehicle.

Camera Activation

An electronic or television camera is mounted in the vehicle for facial recognition and is described in more detail below. In one embodiment, power from the vehicle's battery (not shown) is gated to operate the television camera when multiple-contact key switch 22 is closed by hand. For vehicle operation in which a key-switch is not used, a normally open pressure or free-operated limit switch 40, shown in FIG. 2 supported in the driver's seat 21, or a proximity or presence sensor (not shown) mounted in an appropriate location, can be provided to detect the presence of a driver 20 in driver's seat 21. When such switch 40 is closed, it operates to connect the car's battery to the television camera, as described, and to enable operation of the vehicle. For electric-motor-operated vehicles, a normally open toggle, membrane, or pushbutton switch located on the dash, steering wheel column 23, or steering wheel 39 can be employed, and can be closed by hand to initiate operation of the vehicle after the driver is computer-recognized.

Alternatively, electronic camera 12 can be provided its own power supply 50, and the above-described activation systems can be applied to connect such power supply 50 to camera 12, when electronic input port 63 receives control signals from activation of seat sensor switch 40. See FIG. 3.

For added security, the powering system used to activate the camera can be controlled by a timer (not shown), which deactivates the camera after a preset time period. If person 20 in the driver's seat 21 is recognized before the time limit, then the camera will be deactivated automatically. However, if the time limit expires without effecting such recognition, then the camera will be deactivated. The deactivation can continue until the driver departs the vehicle, or the camera can remain deactivated for a preset period, such as a few minutes. In either event, such delay is intended to frustrate the potential thief, particularly one who is unaware of the operation of the system, because of the time-delay feature.

Facial-Recognition Systems

However activated, the camera operates to scan an image field containing the face of the person in driver's seat 21. The data signals output by the camera are computer-processed and analyzed by an image-analyzing computer described below and supported at a convenient location in the cabin. If, as a result of such scanning and computerized image analysis, recognition is effected of the image signals output when the camera scans facial features of person 20, coded control signals indicating recognition of the person scanned are generated on the output of the computer and are applied to close enabling switch 25, thereby passing electrical energy from the vehicle battery to a starting motor 36 and to the ignition system of the vehicle or otherwise initiating the selected of the above-described enabling devices.

As noted above, machine-vision systems employing computerized image analysis of facial features are known in the art. Such systems may operate by examining information resulting from visual images or thermal patterns of all or select portions of the face. For thermal pattern analysis, it is known that arteries and veins emit infrared radiation (heat), which varies in intensity across skin surface and can be identified. U.S. Pat. No. 4,699,149 to Rice and the references cited therein describe representative systems of that sort and are incorporated herein by reference. Such thermal systems can be used to recognize facial arterial and venous structures. Thermal scans are particularly useful, because they are more difficult to counterfeit than reflected-light, visual-based systems. For example, a determined thief may use a mask with an image or a person known to be authorized, but a thermal system would be harder to defeat in that manner. In addition, such infrared patterns in the face remain substantially unchanged for adults over a number of years.

In a modified embodiment, an infrared electronic camera 12B and a conventional television camera 12A (see FIG. 3) can be supported side-by-side and used in tandem, either simultaneously or sequentially, to improve the capability of the system. The system can be operable to require a potential driver 20 to "pass" both scans, or to permit vehicle operation upon recognition by only one of the two system scans. The former would improve security, but the latter would permit the system to be less sensitive to normal day-to-day variations in the facial appearance of the driver, such as occurs when the person wears an adhesive bandage or facial make-up or when overheated or chilled by external weather.

Another system, using scanning of the iris of the driver's eyes, can be employed. U.S. Pat. Nos. 4,109,237 to Hill and 5,291,560 to Daugman are representative of that system and incorporated herein by reference. Iris scanning has particular advantages in combination with the embodiment using a reflected image that is discussed below.

The scanned data are encoded, in accordance with known classification techniques, and such codes are electronically compared to similarly pre-coded information derived from stored recordings of a similar image or infrared patterns of the particular persons authorized to operate the motor vehicle. The stored recordings are made when the system is first installed in the vehicle and may be supplemented when an additional person is later authorized to drive the vehicle.

One example of a classification and encoding system employable in the instant invention is described in *Scientific American* magazine of December 1995, at page 25 (incorporated herein by reference), which describes a system of facial re-creation based on classification of scanned faces into a series of standards, called "eigenheads." As set forth in the article, a new face in a two-dimensional picture can be expressed by a combination of no more than a few dozen of the eigenheads. Thus, it is possible to use the classification system outlined in the article to model a face scanned in an image field, which can thus be characterized as a combination of the eigenheads. When a particular face is scanned, it is compared with each of the eigenheads, and the characteristics of the scanned face is therefore expressed without using a large quantity of data.

In such an encoding system, a memory associated with the microprocessing system can store the identity of the members of the subset of all eigenheads that together define the face of each authorized driver, and another memory stores the characteristics of each of the eigenheads in the complete set. When a face is presented to the system for scanning, a microprocessor calculates its eigenhead subset by comparison to the stored eigenheads, in accordance with the algorithm of the system, and the results are compared with the stored subsets for each of the authorized drivers. Comparison between a pair of subsets can be accomplished in any suitable fashion, such as a "number of mismatches" technique, in which the number of subset members after excluding matching eigenheads is compared to a predetermined threshold value. If the number of mismatches is less than the cut-off value, which is set to permit some degree of tolerance for slight variations from one scan to another, then the scanned face is considered to "match" the stored coefficients for a particular face, and the scanned person 20 is considered to have been identified as an authorized driver. Alternatively, the match process can be weighted, so that matching certain important eigenheads will result in a more likely determination of a match. Alternatively, the coefficients describing the eigenheads can be compared to the standard set of coefficient by a "least squares" or "distance" type calculation.

Another approach to the recognition of facial features has been described in a 1993 IEEE article entitled "Recognition of Facial Expressions using Conceptual Fuzzy Sets" ("CFS's") by Ushida, et al., which is incorporated herein by reference. The Ushida article uses CFS's to recognize facial expressions such as angry, happy, and sad expressions using eyebrow, eye, and mouth characteristics. Classification is accomplished based on use of a CFS network that determines the most likely expression using combinations of eyebrow, eye, and mouth characteristics. The same CFS techniques employed by Ushida for expression recognition can be applied to facial feature recognition and hence identification of an individual.

In such types of systems, a match, resulting from such automatic identification, results in control signals being generated and applied to close switch 25, thereby completing a circuit through ignition switch 18 and permitting operation of the vehicle.

Camera Placement and Type

FIG. 1 also shows several different placements of scanning cameras capable of generating the signals described above:

- A first camera 31 is mounted on a vertical support beam 15A adjacent to driver's seat 21. Alternatively, camera 31 can be supported by the lower horizontal windshield frame member or on the dashboard 29 immediately in front of the driver.
- A second camera 33 is mounted on a horizontal roof-support member 35, in front of and above the head of the person 20 in driver's seat 21. Alternatively, camera 33 can be mounted directly under roof 13, on rear-view mirror 16, on its mount 41, or on windshield 17 itself.
- A third camera 37 is mounted at the hub or center of the steering wheel 39. Alternatively, camera 37 can be mounted on the exterior ring or a spoke of the steering wheel 39.
- A fourth camera 12 is mounted to the side of the "third taillight" 10 facing the back seat. Third taillight 10 is typically mounted at the rear of the automobile, either just inside or just outside of the rear window 43.

In each case, the dashed lines in FIG. 1 show the operative portion of the scanning field of the camera as it cameras 31, 37 and 12 as each is directed at driver 20. Only one of the cameras shown need be used, although it may be desired to include two or more cameras, for example to permit correlation of views or added identification possibilities.

Face or iris scanning can be done by a video or television camera, an infrared camera, a CCD scanning device, or any other suitable scanning system. Alternatively, a light source such as an infrared (or other) laser can be positioned to perform the scan, and a photodetector of reflected light from such source can be positioned to detect the variable reflected light and to generate the data. The camera need not be a motion picture television camera, because a digital electronic still camera can take the necessary "snapshot" of the face of driver 20 for computer analysis.

The camera can be a miniature television camera supported in a flexible bulbous rubber or foam plastic housing secured to the appropriate structure with fasteners or adhesive or by welding. In addition, the camera or its housing can be supported entirely or partly within the vehicle structural members described above, depending on the dimensions of the camera (and processing circuitry) and the support member.

Known electronic cameras, such as commercially available for the purpose of computer analysis of image phenomena, can be employed and are inexpensive. In addition, so called "camera on a chip" systems have been developed, which employ an array of photosensitive detectors integrated onto a single semiconductor integrated circuit, such as a silicon-based "chip" manufactured from wafers. For example, an article in the Mar. 6, 1995, issue of *Business Week,* at page 54-55, entitled "NASA's Tiny Camera Has a Wide-Angle Future," and an article by Fossum entitled "Low Power Camera-on-a-Chip Using CMOS Active Pixel Sensor Technology" in the 1995 *Symposium on Low Power Electronics,* held Oct. 9-10, 1995, in San Jose, both describe one such "camera on a chip" system. Such articles are incorporated herein by reference. Such image scanning systems are also quite small and inexpensive and are well suited for this purpose.

Such face-scanning electronic cameras can also have an appropriate wide-angle lens, to optimize the acquisition of the required image information defining the select facial features. Also, an autofocus system provided in the electronic control system of the camera will help ensure that the features of the face are in focus, for different head locations and seat adjustments.

The camera's lens can be located as described and may be separate from the signal-processing electronics, particularly if the scanning locations specified lack sufficient space to include the entire operating camera in the described housing. Also, a microprocessor or microcomputer, designed to assist in the processing of the image signals generated by the camera, can be located at any point between the camera and the ignition or start-switch 25, including adjacent to or within the housing of the camera, adjacent to such switch, or along the line between the two.

In the above-described front-frame-supported locations, communication between the camera and the signal processing electronic circuitry can be effected by wire or cable that extends from the camera along or within the windshield frame member 35, then through vertical frame member 15 and beneath dashboard 17 to key-operated switch 22, which is connected to the battery, starter 36, or other enabling system, which is located under hood 19, or at any other convenient location. Alternatively, wiring from the camera can bypass ignition switch 22 and connect to an "AND" circuit, which has a second input from ignition switch 22. Such wiring can also supply power from the vehicle's battery system to the camera.

The electronic camera or scanner can also be controlled in its operation by wireless control signals or codes transmitted to a receiver on or adjacent to the camera, such as from a transmitter located at ignition switch 22 or a start switch (not shown). In such embodiment, the camera is activated each time the ignition or start switch is closed, by key or by manual operation.

If steering wheel 39 is angularly adjustable, it is advantageous to locate the camera 37 at the hub of the steering wheel. Such angle variations simultaneously position the scanning axis of the camera 37 to permit it to scan the face of driver 20, over a wider range of heights and distances (such as by virtue of seat adjustments). The placement of a suitable angle lens of camera 33 on the driver's rear-view mirror 16 provides similar advantages.

Rear-Taillight Embodiment

Figure 2:
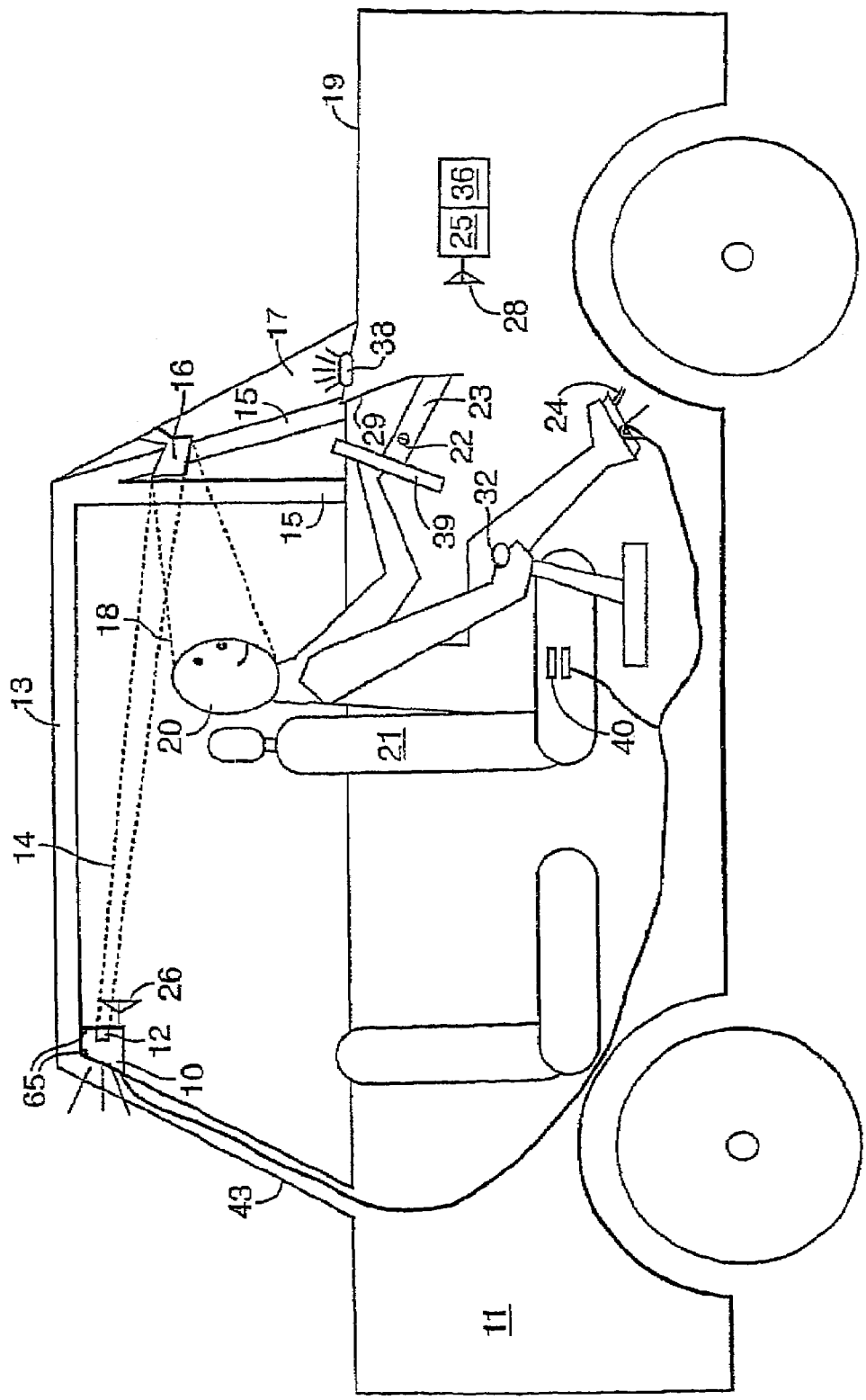
FIG. 2 is a side view of the embodiments of FIG. 1, with additional details shown.
Figure 3:
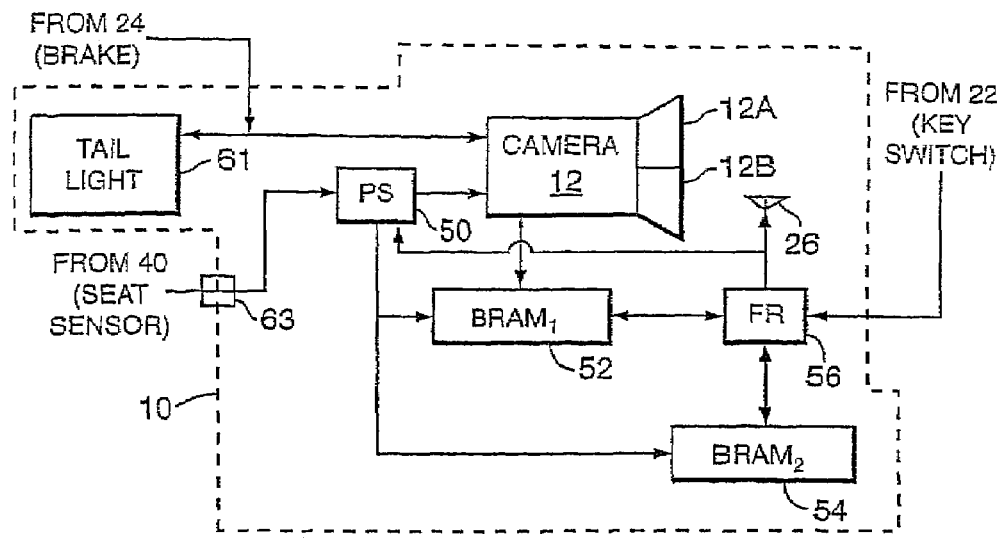
FIG. 3 is a schematic diagram showing certain aspects of a "third taillight" assembly designed for use with one of the embodiments shown in FIGS. 1-2.
Figure 4:
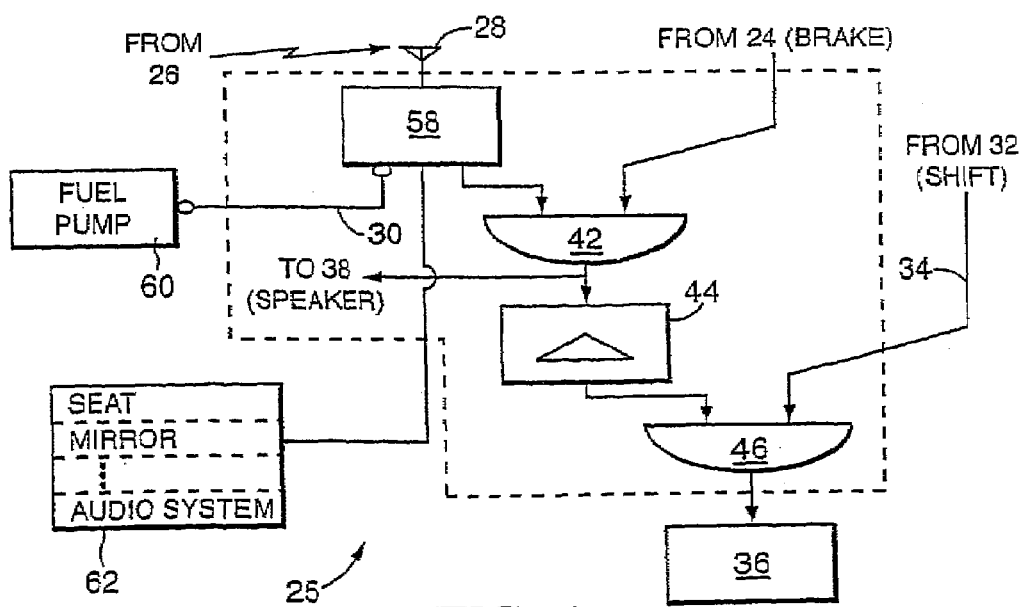
FIG. 4 shows a schematic diagram of certain electrical interconnections associated with an embodiment of the invention.

FIGS. 2 through 4 show particularly preferred embodiments of the system, which also illustrate some of the details of the generalized system discussed above. Camera 12 is shown supported within taillight housing 10, which also contains the "third taillight," which directs its light through the rear window of the car. In recent years, regulatory requirements have specified that all new cars include such a "third taillight," located along the central vertical plane of all passenger automobiles, which has been shown to reduce the frequency of "rear-end" accidents.

Manufacturers have mounted such "third taillights" at a number of locations. Frequently, the assembly is mounted just inside rear window 43, either near the top center of the window (usually suspended from roof 13), or near the bottom center of the window (usually supported on the rear deck of the car, above and to the rear of the back seat). Such taillight has also been mounted behind rear window 43, such as on the rear edge of roof 13 or on the rear edge of a spoiler (not shown) at the back end of the trunk.

Path 14 shows the scanning field of fixed-angle camera 12 from the "third taillight" assembly, passing through the rear-view mirror 16, which is mounted on front windshield 17 or suspended from cross-beam 35 or the front end of roof 13. Thus, camera 12 has a reflected view 18 of the face of person 20 in seat 21, assuming that mirror 16 is properly adjusted and that there are no obstructions between housing 10 and the mirror.

The scanning area of the face of driver 20 from camera 12 is restricted in this embodiment to the portion of the face reflected in mirror 16 to the scanning camera. However, the placement of camera 12 just below the rear end of roof 13 of the vehicle and preferably just inside rear window 43 will permit suitable facial scanning. Ordinarily, the driver 20 will manually adjust mirror 16 so that the driver will be able to view both the top and bottom of rear window 43 in the mirror. Thus, a horizontal image plane passing through the driver's eyes and the top edge of mirror 16 will, when reflected by such mirror along a rearwardly extending path 14, intersect just above housing 10 and camera 12. Consequently, as seen in FIG. 2, the image plane between camera 12 and the top edge of mirror 16 will, when reflected along a path 18, necessary pass somewhat above the eye level of driver 20, as long as mirror 16 has been correctly adjusted.

The image plane extending between camera 12 and the bottom edge of mirror 16 will, when reflected by mirror 16 along path 18, pass substantially below the eye level of the person 20. If camera 12 were located at the middle of the rear window 43, then the image planes reflected from the top and bottom edges of mirror 16 would pass equidistant above and below eye level, respectively. In the embodiment shown in FIG. 2, camera 12 is placed substantially above the middle of rear window 43, thereby causing the portion of the face scanned by camera 12 to be that part beginning a bit above eye level and extending much below it. Such scanning area of the face is desirable to permit the facial-recognition procedure to ignore the scanning of foreheads, and to ensure the scanning of mouth and chin structures. Thus, mounting the scanning camera of the "third taillight" system near the top of rear window 43 is a preferred arrangement for a system using facial scanning.

As indicated above, on many motor vehicles, the mount for the "third taillight" is located in such a preferred position. However, the system can also operate using alternative locations of the mount and scanning camera. Those vehicle systems that display a taillight from the rear edge of roof 13 permit the camera 12 to be suspended inside the rear window 43 and below the roof 13 and to be coupled to the taillight assembly.

Scanning systems that are mounted at the bottom edge of rear window 43 have operating limitations in ensuring that camera 12 has an adequately wide field of view, in the vertical direction, to permit identification scanning of enough of the face of driver 20. For such embodiments, however, use of the instant security system is not ruled out, for the following reasons: First, such systems will contain a field of view including at least the eyes of the person in the driver's seat 21. Such scanned area may provide sufficient image information for the facial-recognition algorithms to properly recognize authorized drivers. For example, the above-described identification system based solely on iris analysis eliminates the need to include other portions of the face in the scanning field.

In modified forms, suitable face scanning camera locations may be derived by moving the "third taillight" assembly to a preferred location for facial scanning (at the top of the rear window) or by adding a "fourth taillight" or mount there. If the placement of the taillight mount at the bottom of rear window 43 causes severe operating limitations, mounting camera 12 on top of housing 10, as opposed to the bottom or center of the housing, might improve the view somewhat, because the higher the position of camera 12, the more of the face of driver 20 will be scanned.

If the placement of the mount 10 and camera 12 is still such that the camera 12 cannot acquire enough of the face to do facial recognition, a better view can be achieved by widening mirror 16, using a mirror element that extends lower. Alternatively, a small concave mirror element (not shown, which may be cylindrical with a horizontally oriented axis, or spherical, can be added, to "collect" light for camera 12 from a wider range of angles, widening reflection 18 in the vertical direction. Such a mirror element need not cover more than a small portion of the surface of mirror 16, leaving the remainder of the surface flat, to avoid interference with ordinary driving. Although such an added mirror element would distort the camera's image of the face somewhat, the distortion will be uniform from scan to scan. The scans that generate the signals used to define and store information about authorized faces would also be distorted in the same way, so the facial-recognition algorithm would remain workable. Indeed, recognition may even be improved because distinctive features would be exaggerated by the mirror. Such solution can also provide a beneficial side-effect to implementing this security system, by expanding the driver's view in mirror 16 (a function that is achieved by certain rear-view mirrors sold presently on the aftermarket now).

By contrast, the field of view in the horizontal direction is more than sufficient to encompass the entire width of the face of a person 20 in the driver's seat 21, regardless of the location of the housing 10, because of the width of mirror 16.

When driver 20 depresses the brake pedal 24 of the vehicle, the rear taillight 61 in housing 10 is activated, when an electrical switch (not shown) is closed by movement of pedal 24. Such switch can also connect camera 12 to the vehicle's battery or the camera's power source.

There are several advantages of placing camera 12 on "third taillight" housing 10, particularly when housing 10 is positioned just below the centerline of roof 13, as shown in FIG. 2:

Camera 12 need not be driven by motors, which add cost to the system That is because camera 12 has a fixed view of mirror 16, and driver 20 will adjust mirror 16 to see out the rear window, which will automatically cause a reflection of the driver's face to strike camera 12 regardless of the height of the driver or the adjustment of the seat.

If mirror 16 is improperly adjusted or blocked by persons or objects in the rear seat, then camera 12 will not acquire a view of the face of driver 20 and the car will not start. That is a valuable safety feature.

Because the distance along path 14, 18 (between camera 12 and the face of driver 20) is large (as compared to the distance from any of the front-mounted cameras to the face), adjustments of driver's seat 21 forward or back (to suit driver 20) will not alter the focus of camera 12 substantially. Thus, camera 12 will not suffer from out-of-focus problems, even without including an autofocus feature, which adds cost to the system.

Housing 10 can contain the additional elements of the system shown in FIG. 3 without adding substantial dimension to existing taillight housings. By contrast, mounting the camera and associated elements in front of the driver might make them more noticeable or distracting to the driver. Also, space under or in dashboard 29, in or on steering column 23, and on steering wheel 39 is at a higher premium than space in housing 10 near the rear window of the vehicle.

The existing connection between brake pedal 24 and housing 10 can be utilized to activate camera 12, without requiring additional wiring, or transmission circuitry.

The embodiment is designed for simple retrofitting of existing automobiles. Replacing housing 10 with a new unit (or adding a "third taillight" assembly 10 to an older vehicle that lacks one originally) by securing mounting brackets 65 (see FIG. 2) on the replacement taillight assembly 10 to the vehicle, is the most significant alteration needed to implement the system, and adding and connecting a box for the elements of FIG. 4 is the only other required change. It might be desirable to use a special rear-view mirror 16 or to connect the system to other elements (such as speaker 38), in an improved version or in a system designed by a manufacturer and integrated with other features, but such improvements are not necessary in a basic design suitable for aftermarket sales or retrofitting.

The system requires that brake pedal 24 be depressed before the car is made operational, which is another safety feature.

Image Analysis Circuitry

Housing, 10 can also contain the image signal-analyzing computer of the facial-recognition system, as shown in more detail in FIG. 3. In the embodiment shown in FIG. 3, power supply 50 is connected, by seat sensor 40, to camera 12 for a predetermined time or until driver recognition is achieved. However, when power supply 50 is not connected to energize the scanning camera 12, it still provides low levels of power to two random-access memories 52 and 54.

Seat sensor 40 is shown in FIG. 2 as a normally open switch that is closed by the weight of person 20 sitting in driver's seat

21. When such person 20 departs seat 21, switch 40 opens. Sensor 40 can be subject to a number of design variations. It can be located adjacent to seat 21 rather than in such seat as shown. It can be a normally closed switch that is opened by person 20 sitting in driver's seat 21. Other examples of alternative sensors 40 are (1) a limit switch actuated by the opening of the driver's door, (2) a photo-detector and light source, which interrupts a beam when a person 20 passes through the door, and (3) a heat sensor placed in or next to driver's seat 21.

Camera 12 operates to scan the face of the person 20 when such person is in driver's seat 21 and when a switch is closed as the person depresses brake pedal 24. Closure of such switch initiates operation of the camera 12 to cause it to full-frame scan the image of the person 20. The video or digital image captured by camera 12 is stored in first battery-backed-up RAM (BRAM) 52, a temporary or working random access memory. A second BRAM 54 stores codes defining information relating to profiles of one or more persons authorized to drive the vehicle.

Microprocessor or microcontroller 56, which is programmed with an appropriate, known facial-recognition algorithm, operates on the digital image signals stored in first BRAM 52 and creates an encoded representation of the face of person 20 seeking to operate the vehicle. Microprocessor 56 then compares the codes generated with code signals of the similarly encoded profiles stored in second BRAM 54.

Outputs of Authorization System

If microprocessor 56 thus recognizes that the person in the driver's seat is a person authorized to drive the vehicle, a transmitter 26 in the camera housing on taillight assembly 10 transmits an authorization code to enable the vehicle to be operated, as discussed below. Microprocessor 56 also disconnects power supply 50.

The authorization code from microprocessor 56 can also control a sound generator 38 (shown in FIG. 2) to produce an audible tone such as an electronic beep, indicating to such person that he or she has been identified by the computer. If such sound generator 38 does not generate sound after person 20 has tapped brake pedal 24, such person may adjust the mirror or move his or her head to effect the required image identification, so as to permit the television camera to properly scan the reflection of the face in mirror 16.

Sound generator 38 can also comprise a speaker, operable to generate one or more pre-recorded messages or instructions from the memory of a speech synthesizer chip. The warning or instruction system can also be integrated with the vehicle's radio speaker system. For example, the system can be configured to store the name or a personalized greeting, for each authorized driver, and upon recognition of the person whose face is scanned as authorized, the greeting can be played. Alternatively, the system can play on speaker 38 instructions relating to proper facial positioning for correct scanning, perhaps after one or more unsuccessful attempts to acquire a face in the camera's field of view.

Another extension of the system is to include the capability of storing data about the personal preferences of each authorized driver, which can be used to control automatically various powered options in the vehicle. For example, each driver's preferred seat position, cabin temperature, exterior mirror or window adjustments, angle of steering column 23, and music selection or volume can be stored. Upon recognition of the driver, the stored option signals for the recognized driver are applied to adjust those or other variables automatically. Certain recent-model automobiles have an electronically controlled seat-adjustment mechanism 62 (see FIG. 4), for example, which save seat-location preferences of two or more different drivers, such as under "A" and "B" settings. It would be possible to couple such electronically controlled systems to the output of a personal-recognition system of the sort described herein (as shown in FIG. 3), so when the facial recognition system 56 (see FIG. 3) recognizes "driver A," a signal is sent to the known seat adjustment mechanism 62 to put the seat in "position A."

If the driver 20 does not hear the tone indicating recognition, camera 12 can be triggered to repeat the full-frame scan by another tap on brake pedal 24. If the driver's face is not recognized as authorized before the power supply 50 is disconnected from camera 12 by a timing circuit or before the brake pedal is tapped a few times, then the facial image signals are retained in memory, such as in first BRAM 51 or an auxiliary memory (such as a solid-state memory hidden under the hood or in the housing 10 as part of the microcomputer 56), or the calculated codes representing the face of person 20 is stored in second BRAM 54, to provide a record of a person who may have attempted to steal the car or operate it without authorization.

In addition, a switch (not shown) such as located in BRAM 54 can alert the owner that stored information is awaiting downloading. Some time after the unauthorized entry, when an authorized person next activates the system and is recognized by microprocessor 56, the switch is checked and if set, the system provides an appropriate alert message that unauthorized entry had been attempted through speaker 38. Alternatively, a small signal light (either on housing 10 or dashboard 29) can be activated, thus providing the same sort of alert.

Also, in the event of a failure to recognize a person within a pre-specified time, the system can include a standard car alarm system, which provides an audible alarm intended to attract nearby persons. In addition, an appropriate pre-recorded warning message to a potential thief can be played back through speaker 38. Alternatively, the system may be operable to radio transmit an alert code to a remote receiver at a monitor station that an attempt is being made to illegally drive the vehicle.

Storing Faces of Authorized Drivers

To program the preferred embodiment to recognize a particular person authorized to operate the car, the person wishing to be recognized sits in driver's seat 21, places a special key in key switch 22 (see FIG. 2), and turns it manually. The system can be programmed to require, for each vehicle, a special coded series of turns in the key receptacle, which opens and closes the switch in coded sequence. Proper operation of the key permits activation of camera 12 as specified above. Thus, the person seeking authorization turns the key as specified, then positions his or her face 20 properly with respect to the camera or mirror, then (within the preset time) taps brake pedal 24. That sequence activates camera 12 as usual, but also stores the coded results in second BRAM 54 as a comparison standard.

Preferably, the system is set up to require one or more repetitions of the storing operation, to enable the chip to average two or more images of the authorized person's face and store the average as the comparison standard, thus permitting a better match on the authorized person's facial features.

To prevent a potential thief from forging the key or "hot-wiring" the sequence so that the system can store the image of the thief and thereby allow undesired access by the thief, the preferred embodiment can include several precautionary features. First, the lock 22 is positioned and structured to appear as a standard key-based systems. Thus, if some cars in a parking lot do not include the inventive system, a potential thief will not know which ones include this system, because, to all outward appearances, the controls and lock will appear identical to ordinary cars.

Second, the preferred driver enablement system contains a time delay for enabling same. Either the person wishing to become authorized to operate the vehicle must repeat the above-described facial image-scanning sequence after a preset waiting time, such as an hour or two, or the authorization will become effective only after the preset delay time. Thus, a person seeking to steal the vehicle cannot become "authorized" without such substantial delay as to defeat a thief. On the other hand, a person seeking to gain operating permission validly would not typically object to such a delay, because it would occur only once, such as upon purchase of the car or installation of the security system or when a young person obtains a driver's license.

Control Subsystem for Enabling Operation and Motion of the Vehicle

The control signals transmitted by transmitter 26 are received by an antenna 28 associated with the control circuit for start-switch 25, which can be located under the hood adjacent to the motor (see FIGS. 1 and 2). Although the preferred embodiment shows a radio communication system, to permit ease of retrofitting, it should be understood that a direct-wired system can also be employed. The control signals are encoded for a particular vehicle (see FIG. 3), thereby deterring a potential thief from "fooling" the system by applying false control signals directly to receiver 28.

FIG. 4 shows details of the control subsystem for switch 25. A decoder 58 contains appropriate circuitry to decode the control signals received by receiver 28 from transmitter 26 (FIG. 3) and to compare them with the stored "correct" code signals for that vehicle. Any known form of encoding can be employed. For example, the storage circuitry of decoder 58 can contain the "correct" code signals in the form of a "seed" and an algorithm, acid the transmitted signal can contain the code and a time signal produced from a clock circuit in housing 10, in which case the transmitted number defined by the combination of the code and the time is compared with the algorithmic combination of the stored "seed" and the received time. Such a system provides an additional level of security in that the "proper" sequence of bits being transmitted from transmitter 26 to receiver 28 varies in accordance with the internal time of the clock, which makes it more difficult to "forge" the transmission code. More complex encoding schemes can be used, of any known type in the cryptography arts. Also, the encoded control signals can include information specifying which authorized driver the system has recognized, for The purposes discussed herein.

The control signals output by decoder 58 are applied to any of the enabling systems discussed above. FIG. 4 shows an embodiment in which such control signals are ultimately applied to enable an engine starter 36. Receiver 28 and the other circuitry of system 25 are preferably supported in a sealed container, which also houses the particular engine element being enabled or disabled, such as an ignition switch or engine starter 36.

In addition, as a further security precaution, the embodiment of FIG. 4 shows the "NOT" of the signals (which indicates that a match has not been detected in a certain number of tries or after a certain time) being applied along line 30 to disable operation of the fuel pump 60 of the vehicle for a particular period of time. Thus, if improper signals are received are received at receiver 28 such as may occur if there is an attempt at tampering by transmitting a series of select code signals to the receiver, such optional backup system would prevent operation of a critical engine component, such as the fuel pump 60, for a select period of time, semi-permanently disabling the vehicle for a period of time sufficient to deter the theft.

Signals from decoder 58, indicating that the recognition-indicating control signals have been received on receiver 28, are also applied to one input of an "AND" gate 42. The signal can be set to persist for a period of time after receipt of the encoded signals, such as for a few seconds or even a few minutes. The other input to the "AND" gate 42 is received on a line from the switch operated by the brake pedal 24. If brake pedal 24 is engaged and the control signals have been recently enough received, then control signals are sent to sound generator or speaker 33, causing it to produce an audible "beep" or other sound.

The signal output by "AND" gate 42 is also applied to delay circuit 44, which produces a single "spike" or "pulse" output a predetermined time after "AND" gate 42 has been activated. For example, one second after the recognition tone is produced at speaker 38, the pulse may be generated. The pulse is applied to a second "AND" gate 46, which also has as a second input, line 34, extending from a switch operated by the shift lever 32 (see FIGS. 1 and 2). In the preferred embodiment, the signal on line 34 is produced by an appropriate shifting action, discussed below. If shift lever 32 is operated to produce signal on line 34, it is produced for a period of time slightly shorter than the delay time of gate 44. For example, gate 44 has a one-second delay time, and the signals on line 34 can be produced for 0.99 seconds after the shift action. Thus, "AND" gate 46 detects when the proper shift action is taken at any time before the delay time defined by gate 44 expires, beginning when the audible "beep" is produced.

When gate 46 is activated, the signals output thereby are applied to cause activation of the enabling system, such as starter 36 of FIG. 4, permitting operation of the vehicle. Any of the enabling systems discussed above or known in the art can be used with the preferred activation systems. For added security, the enabling system can be included in the same container as the element's shown in FIG. 4, to prevent the possibility of a thief "hotwiring" the car merely by tapping into the line between control unit 25 and starter 36.

In one embodiment, a moveable vehicle (1) having a passenger cabin (13), an engine compartment (19), a rear-view mirror (16) mounted along the centerline of the vehicle at the front of the passenger cabin, a brake pedal (24) in the passenger cabin, and an enabling device (36) supported in the engine compartment and structured to enable motive force to the vehicle, may be retrofitted with a security system. In such retrofitting, a taillight assembly (10) is mounted along the vertical center plane of the vehicle near the rear of the passenger cabin. In one option, the taillight assembly is mounted by suspending it from a roof (13) supported above the passenger cabin.

The taillight assembly includes at least the following elements: (1) a rear-directed light; (2) a front-directed electronic camera; (12) having an output for a picture signal; (3) a facial-recognition system (56) coupled to the output of the camera; (4) an electronic storage device (54) coupled to the facial-recognition system; and (5) a transmitter (26). The facial-recognition system transmits select control signals only if picture signals representative of select characteristics of a scanned face match a member of a set of signals stored in the electronic storage device. Each member of the stored set is representative of select characteristics of the scanned face of an authorized driver.

In retrofitting, the assembly is positioned so that the camera is directed at the rear-view mirror. The light and the camera of the taillight assembly are coupled to a line carrying a control signal that is generated by operation of the brake pedal (see FIG. 2). Also, the control unit and the enabling device are coupled (FIG. 4). The control unit supports a receiver (28) and activates the enabling system only upon receipt by the receiver of the select control signals from the transmitter of the taillight assembly.

In one option, the enabling system of the vehicle is, in the process of retrofitting, replaced by an integral unit (FIGS. 1, 2) containing both the control unit (25) and the enabling device (36). Optionally, in retrofitting, the camera can be coupled to a line carrying control signals that are generated upon activation of a sensor (40) activated by the presence of a person in the driver's seat of the passenger cabin.

Operating the Vehicle

Thus when a prospective operator 20 wishes to drive the car, he or she pushes brake pedal 24, activating camera 12. Assuming the system in housing 10 identifies the person as an authorized driver, encoded signals are transmitted from transmitter 26 to receiver 28 and are decoded by decoder 58. If driver 20 wishes to put the vehicle in motion right away, he or she depresses brake pedal 24 and keeps it down until the "beep" sound is heard.

If, however, driver 20 is not ready to move the vehicle immediately, he or she may simply release brake pedal 24 after a "tap" activating the identification system, and the car will not start until the brake pedal 24 is again depressed. When driver 20 is ready, he or she simply depresses the brake pedal 24 again, the signals from gate 42 are applied to speaker 38, and the process continues, unless the persistence time specified for the operation of decoder 58 has been exceeded.

Other forms of delay systems can accomplish the function of permitting the driver to delay operating the vehicle after effecting positive identification, while maintaining security. For example, the control signals output on 58 may continue as long as driver the 20 does not depart seat 21, as indicated by seat sensor 40, which is coupled to "AND" gate 42. If camera 12 is a motion picture electronic television or infra-red camera, each scanning frame thereof generates output signals, which are transmitted to receiver 28 and decoded by decoder 58, so that the output of decoder 58 persists as long as-the person is recognized. In addition, these embodiments can be combined together or with the persistence time discussed above.

For example, if camera 12 generates a full-frame scan every thirtieth of a second, and the signals on decoder 58 are set to persist for ten seconds, then the system is thereby configured to enable operation of the start-switch as long as the authorized person is recognized at least once in every three hundred tries (30 frames per second multiplied by 10 seconds). If the seat sensor 40 is also connected, then authorization will end immediately after driver 20 leaves the seat. That combined system can permit driver 20 to activate the system but defer moving the car for a while, such as the tine necessary to permit checking of traffic (which requires looking away from mirror 16 for a time), without substantially comprising security.

When the driver 20 wishes to move the vehicle, there is a fixed period of time, specified by delay gate 44, to take the proper action of activating the shift lever. The delay system can be more closely integrated with this delay time, rather than the persistence time for the signals emanating from decoder 58, for the purposes outlined above. In such an alternative embodiment, if driver 20 wishes to delay moving the car after recognition, he or she would initiate the facial scan, hear the approval beep from sound generator 38, and then have a longer time (such as ten seconds) to perform the correct shifting action while looking around for traffic. Alternatively, the system can permit operation of the car after recognizing an authorized person indefinitely, as long as brake pedal 24 remains depressed and seat sensor 40 indicates that driver 20 has not left driver's seat 21.

In addition, the activation system shown in FIG. 4 can be coupled to a motive element of the automobile, such as the transmission or clutch system, the power train, or a flywheel energy storage device. In that case, the system can be configured to permit the motor to begin operation immediately upon identification of authorized driver 20, such as by application of the same control signal that is applied to activate speaker 38. Then, the output of "AND" gate 46 can be applied to engage the motor to permit vehicle motion, by application of the output signals to the selected motive element after the shift action. This arrangement is preferable for current internal-combustion automobiles, because engines generally require some warm-up time, or at least a few "revs," before the drive train is engaged. However, for electric vehicles, in which the motor can be started and the drive train engaged essentially simultaneously, this modification is unnecessary.

The advantage of the control system shown in FIGS. 3 and 4 include:

The system prevents theft or operation by unauthorized persons and maintains a record of any person attempting to do so.

No key is required to start the car, if an authorized person 20 is in driver's seat 21. Thus, it is possible to have a fully auto-starting car. However, the system is easily combined with any existing or supplemental security system, even an ordinary ignition key, if it is desired to have such.

The system is difficult to defeat by "hotwiring," because of the near simultaneity of action required by seat sensor 40, brake pedal 24, shift lever 32, and facial recognition by microprocessor 56, and the specified ordering of those elements. As described above, a potential thief could not activate the starting system without sitting in driver's seat 21, activating seat sensor 40, and depressing brake pedal 24. In that physical position, it would be hard to perform any other actions needed to defeat facial-recognition computer 56 or apply a false signal to any other element of the system in line between computer 56 and starter 29.

Auto-Starting Vehicle

If the facial-recognition system is sufficiently discriminating, the security system can also permit operation of a vehicle without use of any ignition key. In a keyless car, an appropriate shifting action can be selected to indicate to the system the driver's desire to enable motion of the vehicle. The selected shifting action depends on the type of vehicle. The considerations will differ between automatic transmission and manual transmission vehicles, between electric and combustion-based vehicles, and perhaps among vehicles using alternative fuel types such as methane or hydrogen based fuels. For example, using the system as shown in FIG. 4, driver 20 can start the motor (with motor starter 36) merely by shifting transmission lever 32 from "neutral" to "drive" or from "neutral" to "reverse" within the specified delay time after the approval beep.

In a car with a manual transmission, the shift action required is from "neutral" to first gear or from "neutral" to reverse gear, and the clutch pedal (not shown) must be depressed during the shift action. If the car is parked in gear, such as is common with manual-transmission vehicles, then driver 20 would depress the clutch and rock the gearshift from first to neutral and back again to start the car. Such a shift sequence is already a habit or many drivers of manual-transmission cars, to make sure that the transmission is firmly in gear. Thus, the system requirement that the transmission be first taken out of gear and then placed back into gear, if the car has been parked in gear, is not a substantial inconvenience.

Such an "auto-starting" vehicle also requires a system that can turn the motor off when appropriate and only when appropriate. While it is possible simply to add an "off" button, that solution it is less desirable because of (1) the possibility of accidentally pressing the button while the car is in motion, and (2) the loss of standard appearance. The first problem (accidental pressing) can be solved or reduced by requiring activation of the "off" button together with detection of a door opening, or by using such protection systems like used in ignition switches presently (for example, making the switch more difficult to turn to "off" than to "on"), or by placing the button in a location that is protected, such as under a cover.

Instead of an "off" button, in an automatic vehicle, the system can be configured to deactivate the motor when the transmission is placed into "park," or if desired, when seat sensor 40 is deactivated, or both. One of both of those can be combined with detection of the driver's door being opened, using a simple sensor such as is currently commonly used to control the interior lighting. A preferred embodiment deactivates the motor when the transmission is shifted to "park" and a "door open" condition is detected.

For a manual-transmission vehicle, the system can be wired so that opening the driver's door with the clutch depressed is interpreted as an instruction to disengage the motor, eliminating the need for an "off" switch. Also, particularly for manual cars, coupling the "off" function to the emergency brake is preferred, to ensure that the emergency brake is engaged in all parked vehicles, as an added safety measure. (In such embodiment, a separate "off" switch in the engine compartment, such as on the starter, or a detachable wire thereon, enables the car to be towed or pushed, so that the emergency brake need not be set or the motor continue to run during the tow.) Thus, a preferred embodiment for manual vehicles deactivates the motor when the clutch and emergency brace are engaged and a "door open" condition is detected.

Extensions

Other options for possible variations to or extensions of the system are discussed below:

1. In the event that the system fails to identify an authorized person 20 whose face is electro-optically scanned, and the system is configured to digitize and record the scanning signals (reflective or infrared or both) or the coded signals, then the stored or reconstructed full-frame digital picture signals, which serve as a record of the face of a person who may have attempted to steal or operate the vehicle without authorization, can be automatically communicated via radio or cellular telephone to a receiver at a station with a visual monitor. Alternatively, the stored signals can be saved every time the vehicle is operated and accessed remotely in response to a query code transmitted to a receiver (not shown) in the vehicle, which is coupled to address the memory storing the information. Thus, if a vehicle is stolen by ah authorized person, or a person who has forged an authorization, then an operator at the central location can find out who last drove the car.

2. An electro-optical scanning system, such as described above, can be supported within a cavity in steering wheel 39, which cavity is covered or filled with a transparent or translucent plastic window, and from which the camera can scan one or more portions of the face, the fingerprint or fingers of a hand or hands grasping steering wheel 39. Such camera can be activated by a pressure or membrane switch in a cavity in the steering wheel, which is closed when the wheel 39 is gripped as in the act of steering.

3. The electrical data signals generated by any camera system or systems described above, can be used in combination with another security system, for further security. For example, as a supplement to the facial-scanning camera, a fingerprint scanner 68 can be provided in a housing attached to or extending from the frame 15 or mount 41 for the rear view mirror 16, the steering wheel 39, the hub 37 thereof, the driver's side arm-rest, the central console (this option is shown in FIG. 1), or any suitable location easily accessed by a person sitting in driver's seat 21. Also, computerized image analysis can be combined with electronic voice-signal analysis and computer recognition, by use of a microphone supported in a cavity in the steering wheel or in a housing attached to one of the above-described structural features.

The various signals described above as being transmitted from one location to another in the vehicle are generally discussed as using transmission along line paths. However, one skilled in the art will readily understand that single-line wire transmission can be replaced with a variety of known alternatives, including wireless transmission, optical fiber or cable, or a multi-wire control bus of any known shape, and that systems using frequency or time-division multiplexing can be used to transmit across any of those media. Code-division multiplexing can be used for wireless links. Thus, while only some of those alternatives are discussed expressly alone, the terms "wire" and "line" shall be understood as encompassing any known combination of network topology and transmission media.

While some of the signals produced or used by the system are described herein as "code signals" or "control signals," the ordinarily skilled artisan will readily understand that such "signals" may consist of a single-pulse digital signal, an analog signal, or a train of bit signals, and that such signals may be coded or not. All of those alternatives are intended to be included within the scope of the term "signals." Similarly, the term "set of signals" is intended to refer to one or more of such signals, each of which is intended to refer to an authorized driver.

Although the invention has been described with reference to specific embodiments, many modifications and variations of such embodiments can be made without departing from the innovative concepts disclosed.

Unless specifically noted it is intended that the words and phrases in the specification and claims be given the ordinary and accustomed meaning to those of ordinary skill in the applicable art or arts. If any other meaning is intended, the specification will specifically state that a special meaning is being applied to a word or phrase.

Likewise, the use of the word "function" in the specification is not intended to invoke the provisions of 35 U.S.C. § ¶ 6 to define the invention. To the contrary, that paragraph will be considered to define a claimed element of the invention, only if the phrases "means for" or "step for" and a function, without also reciting in that element any structure, material, or act in support of the function, are specifically recited in that element. Moreover, even if the provisions of 35 U.S.C. § 112, ¶ 6 are invoked to define the invention, patentee intends that the invention not be limited to the specific structure, material, or acts that are described in the preferred embodiments. Rather, "means for" or "step for" elements are nonetheless intended to cover and include within their scope any and all known or later-developed structures, materials, or acts that perform the claimed function, along with any and all equivalents.

Thus, it is understood by those skilled in the art that alternative forms and embodiments of the invention can be devised without departing from its spirit and scope. The foregoing and all other such modifications and variations are intended to be included within the spirit and scope of the appended claims.

We claim:

1. A security system for a movable vehicle provided with an enabling system, the security system comprising:
   (a) an electronic camera positioned to scan at least a portion of the face of a person located at the driver's station of the vehicle and structured to produce image signals;
   (b) an electronic facial-recognition system responsive to the image signals and controllably coupled to the enabling system; and
   (c) an electronic storage device coupled to the facial-recognition system to store a set of image signals, such that the facial-recognition system activates the enabling system only if signals representative of select characteristics of the scanned face of the person derived from the image signals produced on the camera's output match a member of a set of signals stored in the electronic storage device, each member representative of select characteristics of the scanned face of an authorized operator.

2. The system of claim 1 wherein the camera is an infrared scanner.

3. The system of claim 2 further comprising another electronic camera that is a scanner sensitive to visible light, wherein both cameras are positioned to scan at least a portion of the face of the seated person and are coupled to the facial-recognition system.

4. The system of claim 1 wherein the portion of the face scanned by the camera includes an iris of an eye of the person at the driver's station, and wherein the electronic facial-recognition system is structured to recognize characteristics of features within the iris.

5. The system of claim 1 wherein the camera is mounted in front of the driver's seat and directed at the driver's face, the camera being supported by a mount for an interior rear-view mirror of the vehicle.

6. The system of claim 1 wherein the camera is mounted in front of the driver's seat and directed at the driver's face, the camera including an autofocus lens control.

7. The system of claim 1 wherein the camera is mounted in front of the driver's seat and directed at the driver's face, the camera being mounted on a steering wheel of the vehicle.

8. The system of claim 7 wherein the camera is mounted at the center of the steering wheel.

9. The system of claim 1 wherein the camera is structured to automatically become deactivated upon expiration of a predetermined period of time after it is first activated or upon recognition of an authorized driver by the facial-recognition system, whichever occurs first.

10. The system of claim 1 wherein the camera is activated by closure of an ignition key switch of the vehicle.

11. The system of claim 1 wherein the camera is responsive to activation of a sensor switch by a person sitting at the driver's station of the vehicle.

12. The system of claim 11 wherein the sensor switch is an in-seat sensor.

13. The system of claim 12 wherein the camera is structured to become deactivated upon opening of the sensor switch.

14. The system of claim 1 wherein the electronic storage device contains a personal code associated with each authorized operator, and wherein the facial-recognition system is further coupled to an electronic control of the vehicle so as to alter a personal setting automatically based on the code associated with the operator recognized by the facial-recognition system, said electronic control structured to control an operating setting of at least one of the following elements of the vehicle:
   (a) an audio system;
   (b) an electronic seat;
   (c) a window;
   (d) a temperature controller;
   (e) a mirror; and
   (f) the angle of the steering wheel column relative to the dashboard.

15. The system of claim 1 wherein the facial-recognition system is structured to trigger an audible alarm upon failure of the facial-recognition system to effect the match after a predetermined time.

16. The system of claim 1 wherein the facial-recognition system is structured to transmit alarm signals to a remote location upon failure of the facial-recognition system to effect the match after a predetermined time.

17. The system of claim 1 wherein the facial-recognition system is structured to retain in non-volatile storage information derived from the signals on the camera output upon failure of the facial-recognition system to effect the match after a predetermined time.

18. The system of claim 17 wherein the facial-recognition system is structured to activate a signal light upon failure of the facial-recognition system to effect the match after a predetermined time.

19. The system of claim 1 wherein the facial-recognition system is further coupled to a key-operated switch that, when activated, stores in the electronic storage device, as representative of a member of the set of authorized operators, selected signals representative of select characteristics of the scanned face of a person located at the driver's station of the vehicle and derived from the signals on the camera output.

20. The system of claim 19 wherein the key-operated switch is structured to become activated by a coded sequence of turns.

21. The system of claim 19 wherein the facial-recognition system is structured to become disabled for a predetermined period of time upon activation of the key-operated switch.

22. The system of claim 1 wherein:
   (a) the facial-recognition system issues an authorization control signal upon determining said match;
   (b) the system further comprises a second personal-identification system; and
   (c) the authorization control signal is produced only in response to identification of an authorized operator by both the facial-recognition system and the second personal-identification system.

23. The system of claim 22 wherein the second personal-identification system includes a fingerprint reader.

24. A method for maintaining security of a powered vehicle, the method comprising:
   (a) producing image signals by electronically scanning at least a portion of the face of a person located at the operator's station of the vehicle;
   (b) computer analyzing the image signals and generating code signals representative of a set of predefined facial characteristics;
   (c) comparing the code signals with a set of previously stored reference signals representative of the predefined facial characteristics of an authorized operator; and
   (d) generating signals enabling operation of the powered vehicle if and only if the code signals electronically match the reference signals.

25. The method of claim 24 wherein the scanning is with respect to infrared radiant emissions from the face of the person.

26. The method of claim 24 further comprising initiating scanning by determining that the person has pressed a brake pedal of the vehicle.

27. The method of claim 24 further comprising automatically repeating acts (a) through (d) until the earlier of (i) expiration of a predetermined length of time and (ii) generation of the enabling signals.

28. The method of claim 24 further comprising detecting when a person is located at the operator's station and effecting such scanning only when a person is so located.

29. The method of claim 28 further comprising the preliminary act of activating a key-operated switch in the passenger cabin coupled to the facial-recognition system to store the reference signals.

* * * * *